(12) United States Patent
Revidat

(10) Patent No.: US 11,649,794 B1
(45) Date of Patent: May 16, 2023

(54) METHOD AND SYSTEM FOR DIRECT INJECTION OF AN IMPROVER ENRICHED FUEL INTO AN INTERNAL COMBUSTION ENGINE OF A MOTOR VEHICLE

(71) Applicants: HYUNDAI MOTOR COMPANY, Seoul (KR); KIA CORPORATION, Seoul (KR)

(72) Inventor: Stephan Revidat, Langen (DE)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/732,340

(22) Filed: Apr. 28, 2022

(30) Foreign Application Priority Data

Jan. 14, 2022 (KR) .................. 10-2022-0006022

(51) Int. Cl.
*F02M 43/04* (2006.01)
*F02M 55/04* (2006.01)
*F02M 55/02* (2006.01)
*F02M 59/10* (2006.01)

(52) U.S. Cl.
CPC .......... *F02M 43/04* (2013.01); *F02M 55/025* (2013.01); *F02M 55/04* (2013.01); *F02M 59/102* (2013.01)

(58) Field of Classification Search
CPC ..... F02M 43/04; F02M 55/025; F02M 59/102
USPC .................. 123/1 A, 304, 445, 575
See application file for complete search history.

(56) References Cited

U.S. PATENT DOCUMENTS

| 7,537,646 | B2 | 5/2009 | Chen et al. |
| 7,867,324 | B2 | 1/2011 | Chen et al. |
| 2007/0082305 | A1 | 4/2007 | Chen et al. |
| 2010/0064894 | A1 | 3/2010 | Chen et al. |
| 2014/0202420 | A1 | 7/2014 | Jaasma et al. |
| 2020/0182173 | A1 | 6/2020 | Oh et al. |
| 2021/0404394 | A1* | 12/2021 | Wloka ............... F02D 19/0694 |

(Continued)

FOREIGN PATENT DOCUMENTS

| DE | 102017123315 A1 * | 4/2019 | ........... F02D 19/061 |
| EP | 1775514 B1 | 5/2013 | |
| WO | WO-2018054786 A1 * | 3/2018 | ......... F02D 19/0647 |

OTHER PUBLICATIONS

Ickes et al., Effect of 2-Ethylhexyl Nitrate Cetane Improver on NOx Emissions from Premixed Low-Temperature Diesel Combustion, Energy & Fuels 2009; 6 pp.

*Primary Examiner* — Erick R Solis
(74) *Attorney, Agent, or Firm* — Lempia Summerfield Katz LLC

(57) ABSTRACT

A method and a system provide direct injection of an improver enriched fuel into an internal combustion engine of a motor vehicle. The method comprises providing a fuel with a fuel pump under a first pressure at a fuel inlet of an injector nozzle and providing a fuel improver with an improver pump under a second pressure at an inlet bore of the injector nozzle arranged downstream of the fuel inlet with respect to a nozzle outlet of the injector nozzle. The second pressure is higher than the first pressure at least for a limited time interval prior to injection to enrich the fuel with the fuel improver within the injector nozzle. The method also comprises injecting the improver enriched fuel into the internal combustion engine at the nozzle outlet.

20 Claims, 3 Drawing Sheets

(56) References Cited

U.S. PATENT DOCUMENTS

2022/0018321 A1* 1/2022 Kolhouse ................. F02B 1/10
2023/0026883 A1* 1/2023 Hou ................... F02M 21/0215

* cited by examiner

METHOD AND SYSTEM FOR DIRECT INJECTION OF AN IMPROVER ENRICHED FUEL INTO AN INTERNAL COMBUSTION ENGINE OF A MOTOR VEHICLE

CROSS-REFERENCE TO RELATED APPLICATION

This application claims priority to and the benefit of Korean Patent Application No. 10-2022-0006022, filed in the Korean Intellectual Property Office on Jan. 14, 2022, the entire contents of which are incorporated herein by reference.

TECHNICAL FIELD

The present disclosure pertains to a method and a system for direct injection of an improver enriched fuel into an internal combustion engine of a motor vehicle and pertains to a motor vehicle with such an injection system.

BACKGROUND

In order to fulfill customer's highly sophisticated demands on passenger vehicles and to meet future $CO_2$ emission targets as well as exhaust gas emission regulation targets, modern high-efficient gasoline combustion engines often rely on gasoline direct injection (GDI). This technology enables substantial benefits especially for engines with high specific power output and compliance with the newest exhaust gas regulations.

The fuel supply architecture of modern GDI engines usually delivers gasoline via a high-pressure pump pressurizing the gasoline to a pressure of roughly 50 to 500 bar and pumping it into an injection rail and from there further to the fuel injectors. The gasoline pressure is usually regulated by the engine control unit (ECU) of the vehicle.

As combustion engines will likely remain a relevant power source for mobility for the next decade, emission legislation and especially fuel consumption will also remain as major performance criteria. In this respect, fuels with different properties will also likely become more and more relevant on the market. One recently suggested approach for improving combustion performance includes injecting a mixture of fuel and a combustion improving additive (also called fuel improver, e.g. cetane improvers in the case of diesel fuel, in particular based on ethyl hexyl nitrate (EHN)). See for example Ickes et al., "Effect of 2-Ethylhexyl Nitrate Cetane Improver on $NO_x$ Emissions from Premixed Low-Temperature Diesel Combustion," Energy & Fuels, 23, 10, 4943-4948, 2009. These and similar studies suggest that there could be a high potential for significant reductions in fuel consumption and NOx, HC and soot emissions based on such a combined injection of normal fuel and fuel improver.

Prior art document US 2014/0202420 A1 describes an arrangement and a method for an internal combustion engine with direct dual fuel injection.

Prior art document US 2020/0182173 A1 describes a mixed fuel amount control system applying active purging.

SUMMARY

Hence, there is a need to find practical solutions for utilizing fuel improvers in combustion systems based on direct injection.

To this end, the present disclosure provides a method, an injection system, and a motor vehicle.

According to one aspect of the present disclosure, a method for direct injection of an improver enriched fuel into an internal combustion engine of a motor vehicle comprises providing a fuel with a fuel pump under a first pressure at a fuel inlet of an injector nozzle. The method also comprises providing a fuel improver with an improver pump under a second pressure at an inlet bore of the injector nozzle arranged downstream of the fuel inlet with respect to a nozzle outlet of the injector nozzle. The second pressure is higher than the first pressure at least for a limited time interval prior to injection to enrich the fuel with the fuel improver within the injector nozzle. The method also comprises injecting the improver enriched fuel into the internal combustion engine at the nozzle outlet.

According to another aspect of the present disclosure, an injection system for direct injection of an improver enriched fuel into an internal combustion engine of a motor vehicle comprises an injector nozzle configured to inject fuel into the internal combustion engine at a nozzle outlet. The injection system also comprises a fuel pump configured to provide a fuel under a first pressure at a fuel inlet of the injector nozzle. The injection system also comprises an improver pump configured to provide a fuel improver under a second pressure at an inlet bore of the injector nozzle arranged downstream of the fuel inlet with respect to the nozzle outlet of the injector nozzle. The second pressure is higher than the first pressure at least for a limited time interval prior to injection to enrich the fuel with the fuel improver within the injector nozzle.

According to yet another aspect of the present disclosure, a motor vehicle comprises an injection system according to the inventive concept.

The present disclosure offers a practically feasible and applicable approach for a fuel system based on direct injection that may deliver an improver enriched fuel mixture on demand. One underlying idea of the present disclosure is that a fuel can be enriched by very small amounts of one or several liquid additives in a precisely controlled manner by mixing the fluids shortly before injection based on finely tuned pressure differences. To this end, the fluids are delivered by individual high-pressure pumps and are only mixed with each other within the injector nozzle as shortly as possible before leaving the nozzle at its outlet. To reduce "dead" volumes of the injected liquids and to improve response time, an injector is provided with a simple bore as interface between two or more media.

For example, the ingress volume of the improver may be set very precisely by providing a pressure peak or a pressure plateau in the pressure of the improver compared to that of the main fuel prior to injection. In this vein, mixing ratios can be adapted very quickly depending on a current operation point of the respective engine. Hence, dynamic behavior and stable mixing in the parts-per-million (ppm) range is achievable based on the present disclosure even in mass produced vehicles. Moreover, the inventive concept of the present disclosure can in principle be retrofitted to existing injection systems.

It should be understood that the term "vehicle" or "vehicular" or other similar terms as used herein include motor vehicles in general. Such motor vehicles may encompass passenger automobiles including sports utility vehicles (SUV), buses, trucks, various commercial vehicles, and the like. The term "vehicle" or "vehicular" or other similar term as used herein also includes hybrid vehicles, electric vehicles, plug-in hybrid electric vehicles, hydrogen-powered vehicles and other alternative fuel vehicles (e.g., fuels derived from resources other than petroleum). As referred herein, a hybrid vehicle is a vehicle that has two or more sources of power, for example, a vehicle that is both gasoline-powered and electric-powered.

Advantageous embodiments and improvements of the present disclosure may be found in the base and subordinate claims.

According to an embodiment of the present disclosure, the fuel improver may be mixed with the fuel within the injector nozzle with a relative abundance of less than 100 ppm. This may be achieved by configuring the pressure difference between the first pressure and the second pressure and/or a size of the inlet bore accordingly.

Hence, the present disclosure relies on simple means to achieve accurate ingress and mixing of the respective fluids. The fuel components mix with each other due to a finely tuned "micro pressure" difference and due to delivering the additives via a small bore shortly before injection. The improver or additive may thus be mixed with the fuel in every injection cycle without the need for expensive equipment like, for example, micro valves otherwise required for accurate ingress control.

According to an embodiment of the present disclosure, the difference between the first pressure and the second pressure may be less than 10 bar.

The pressure difference for each application may be defined by simulations and/or experiments. A typical pressure range may be between 0.1 bar and 7.0 bar, for example.

According to an embodiment of the present disclosure, a diameter of the inlet bore may be less than 1 mm.

For example, a supply diameter may be in the range between 0.25 mm and 0.75 mm. However, the person of ordinary skill in the art may choose the exact values based on the respective application.

According to an embodiment of the present disclosure, the fuel pump and the improver pump may be mechanically driven together by a camshaft of the internal combustion engine.

This may be accomplished, for example, by providing two (or more) pumping heads of the same or similar type on a common shaft. Such an integrated high pressure module would provide the advantage that the pressurization would be automatically synchronized between the individual pumping heads.

According to an alternative embodiment of the present disclosure, the fuel pump and the improver pump may be provided as separately operated high-pressure pumps, in particular electro-hydraulic pumps.

This approach may be more flexible in certain applications, as the hardware does not have to perfectly match the fuel components (due to the shared volume). Instead, two separately driven (e.g. electrically) and/or operated hydraulic pumps with separate volumes may be employed. In this case, both pumps would, however, need to be synchronized with each other, as this is not automatically given unlike the case of a single camshaft as mechanical actuator.

According to an embodiment of the present disclosure, the fuel pump may provide the fuel at the fuel inlet via a fuel rail and the improver pump may provide the fuel improver at the inlet bore via an improver rail. The improver rail may be separated from the fuel rail.

The micro pressure required for precise ingress control can thus be applied by means of a very small volume change within one of the rails, in particular the improver rail.

According to an embodiment of the present disclosure, pressure within the improver rail may be stabilized relative to the fuel rail by a pressure relief valve coupled to the improver rail.

Hence, the volume may be adjusted in a flexible manner in the improver rail. As a consequence, the pressure difference between fuel and improver may be stabilized without any losses by controlled leakage.

According to an embodiment of the present disclosure, pressure levels within the fuel pump and the improver pump may be synchronized with each other by a joint control unit.

For example, both pumps may be controlled by the engine control unit of the vehicle, which may be communicatively coupled for this purpose with several pressure sensors installed at the rails and/or the pumps.

According to an embodiment of the present disclosure, the fuel may be gasoline or diesel and the fuel improver may be an octane or cetane improver. In an embodiment, the improver may be based on ethyl hexyl nitrate (EHN).

It should be understood however that the present disclosure can also be applied for other purposes, e.g., to boost an engine driven by an alternative fuel and/or to combine different fuels with each other.

According to an embodiment of the present disclosure, the inlet bore may be formed within an injector body of the injector nozzle. The fuel improver may be provided at the inlet bore through an injector jacket enclosing the injector nozzle and arranged offset around the injector body.

Since the mixing is to be executed shortly before the injection, the intrusion of the improver should be realized hydraulically as shortly as possible before the injector tip. Therefore, a bore provided as an interface between the high pressurized fuel inside the injector and the high pressurized improver should be as close as possible to a sealing element towards the combustion chamber (typically a needle or ball). This bore, in particular, requires a very small diameter, since the required flow may be very low, e.g. a diameter between 0.25 mm and 0.75 mm to allow accurate improver intrusion.

These small diameters allow using surrounding material of comparably small strength and thickness for proper robustness against bursting. As the improver nevertheless has to pass to the injector tip, a jacket around the injector with a defined bore for supply is a very practical solution. Such a jacket (including sealing elements) may for example be mounted by a press fit. By such a jacket, the injector body may be sealed against the highly pressurized improver. Since the small diameter allows a high accuracy in dosing by "micro pressure", additional valves are not required.

The present disclosure is explained in greater detail with reference to embodiments depicted in the drawings as appended.

BRIEF DESCRIPTION OF THE DRAWINGS

The accompanying drawings are included to provide a further understanding of the present disclosure and are incorporated into and constitute a part of this specification. The drawings illustrate the embodiments of the present disclosure and, together with the description, serve to explain the principles of the present disclosure. Other embodiments of the present disclosure and many of the intended advantages of the present disclosure should be readily appreciated by reference to the following detailed description. The elements of the drawings are not necessarily to scale relative to each other. In the figures, like reference numerals denote like or functionally like components, unless indicated otherwise.

Although specific embodiments are illustrated and described herein, it should be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION

Since modern cars have to meet highest demands concerning consumption, emission, and performance standards, gasoline vehicles are mostly equipped with direct fuel injecting systems. Gasoline direct injection (GDI) means that the fuel is injected by an injector directly into a combustion chamber of the engine, which then realizes an internal gas mixture. Such GDI systems lead to very efficient and clean combustion. However, with the increasingly tightened regulations on emissions, further improvements to these systems with regards to consumption as well as pollutant performance are desirable.

Recent experimental studies in the laboratory environment have been suggesting that combustion could potentially be improved significantly by mixing the respective fuel with one or several additives, so-called fuel improvers, e.g. octane or cetane improvers for gasoline or diesel based on ethyl hexyl nitrate (EHN). However, this has only been shown in the clean and stable environment of a laboratory. For the application in modern GDI or diesel injection technologies, dynamic behavior and stable mixing in the parts-per-million (ppm) range would be required. Hence, there is a need to transfer the laboratory approach to the street, i.e., to an industrially applicable solution. The present disclosure solves this problem as explained below with respect to the embodiments. When a component, device, element, or the like of the present disclosure is described as having a purpose or performing an operation, function, or the like, the component, device, or element should be considered herein as being "configured to" meet that purpose or to perform that operation or function.

Figure 1:
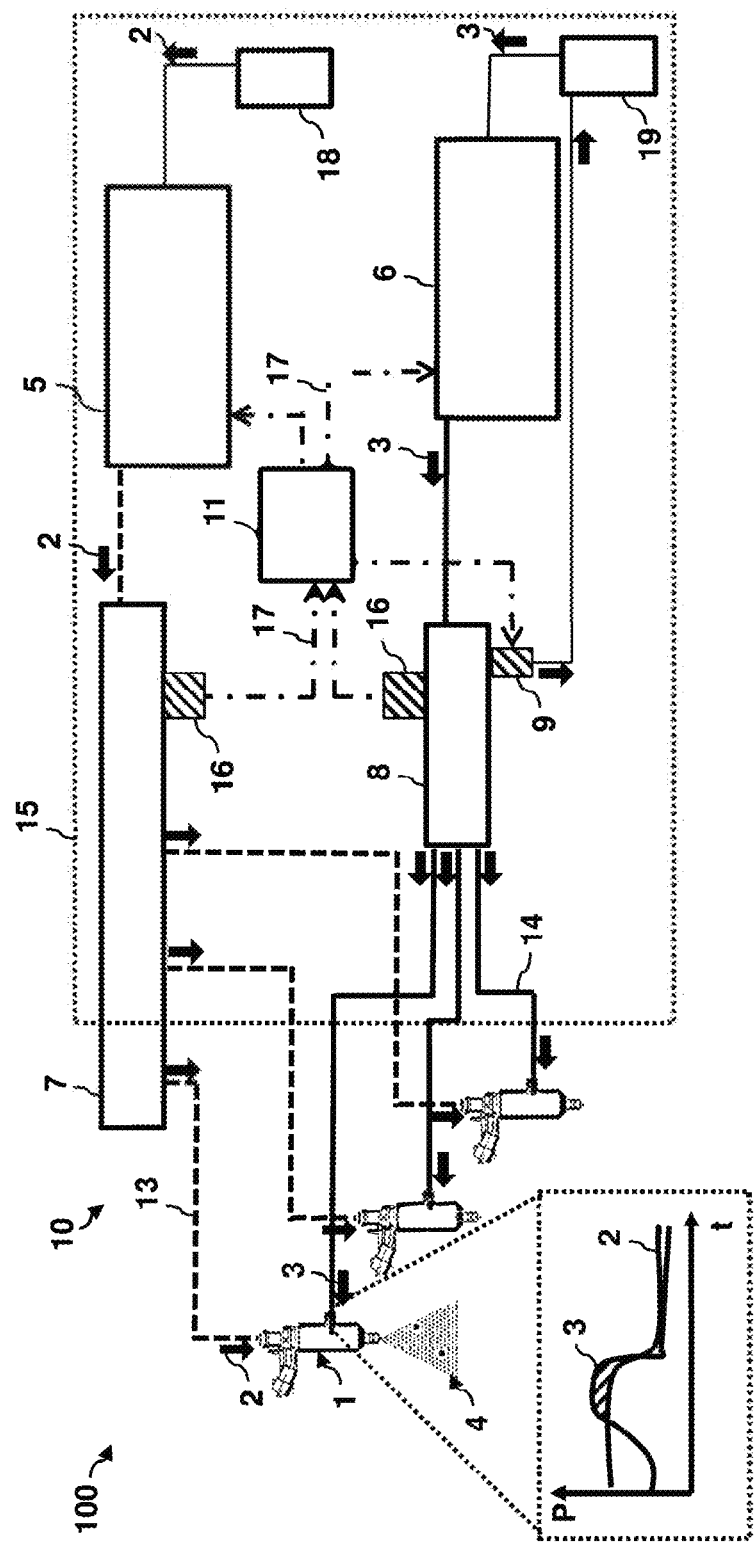
FIG. 1 schematically depicts an injection system for direct injection of an improver enriched fuel into an internal combustion engine of a motor vehicle according to an embodiment of the present disclosure.
Figure 2:
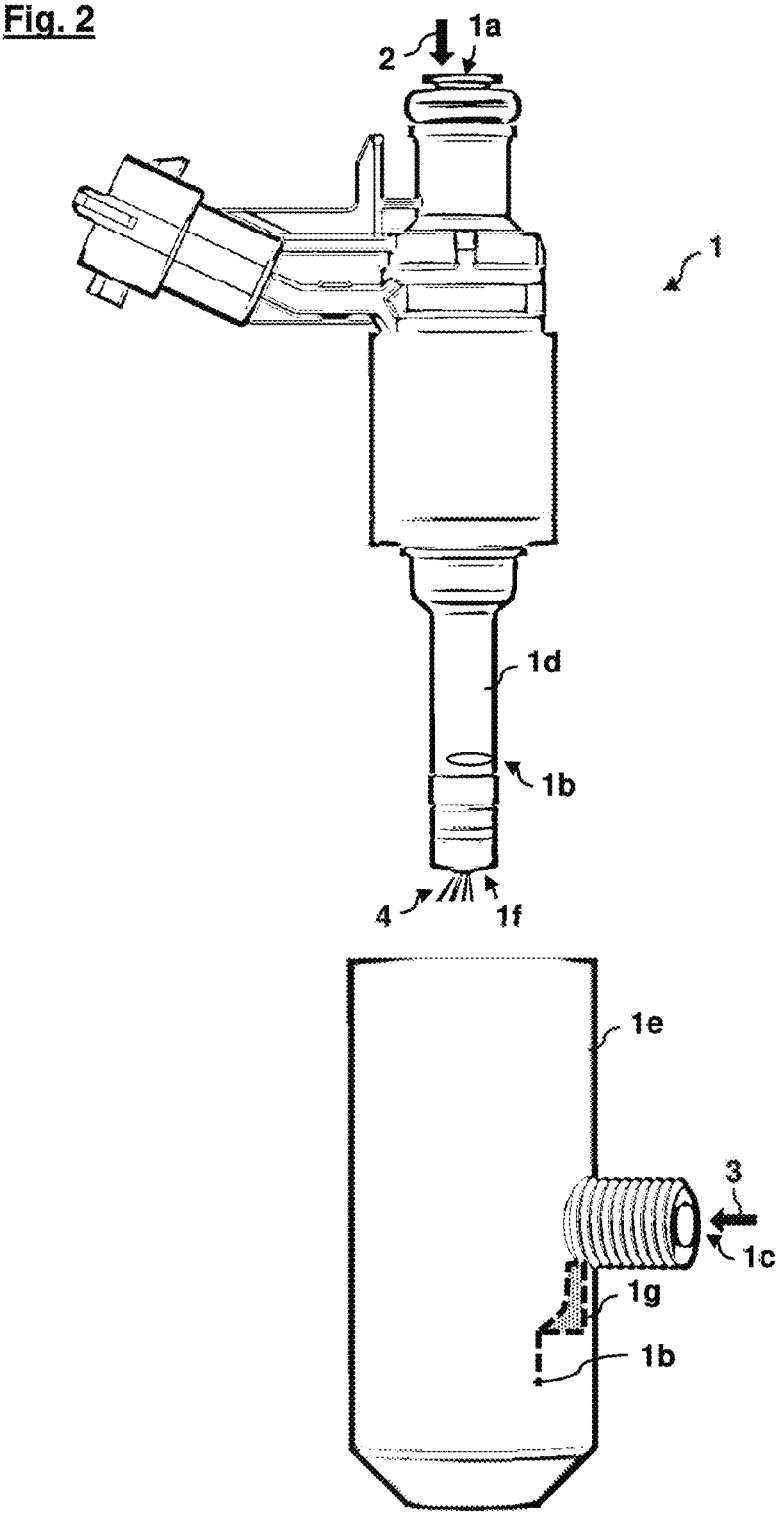
FIG. 2 shows an injector nozzle used in the system of FIG. 1.
Figure 3:
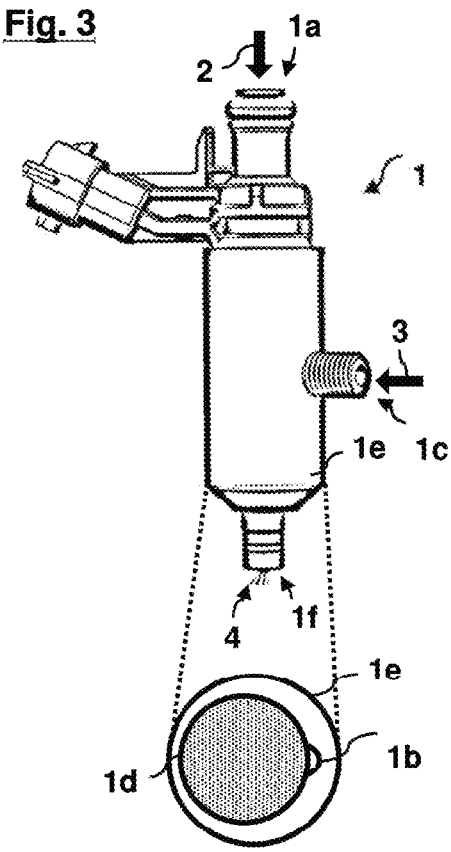
FIG. 3 is another view of the injector nozzle of FIG. 2.
Figure 4:
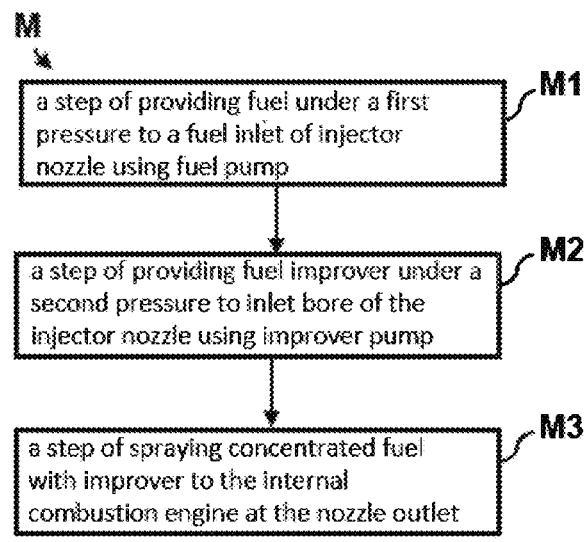
FIG. 4 shows a flow diagram of a method for direct injection of an improver enriched fuel using the system of FIG. 1.

FIG. 1 schematically depicts an injection system 10 for direct injection of an improver enriched fuel into an internal combustion engine of a motor vehicle 100 according to an embodiment of the present disclosure. FIGS. 2 and 3 show an injector nozzle 1 used in the system of FIG. 1. FIG. 4 shows a flow diagram of a method M for direct injection of an improver enriched fuel using the system 10 of FIG. 1.

The injection system 10 comprises several injector nozzles 1 configured to inject fuel into the internal combustion engine (not shown) at respective nozzle outlets 1f. One example of nozzle 1 is shown in FIGS. 2 and 3.

As in common systems, a fuel pump 5 is configured to provide a fuel 2 under a first pressure at a fuel inlet 1a of the injector nozzle 1. In addition, contrary to common systems, the system 10 further includes an improver pump 6 configured to provide a fuel improver 3 under a second pressure at an inlet bore 1b of the injector nozzle 1. The inlet bore 1b arranged downstream of the fuel inlet 1a with respect to the nozzle outlet 1f of the injector nozzle 1 (cf. FIG. 2 in particular). Thus, one of the pumps pressurizes the basic fuel as required for engine demand, while the other constantly pumps and pressurizes the improver, e.g., EHN.

The second pressure is set higher than the first pressure at least for a limited time interval prior to injection to enrich the fuel 2 with the fuel improver 3 within the injector nozzle 1. More specifically, the pressure difference between the first pressure and the second pressure is configured such that the fuel improver 3 is mixed with the fuel 2 within the injector nozzle 1 with a relative abundance of less than 100 ppm. For example, the difference between the first pressure and the second pressure may be less than 10 bar, e.g. smaller than 7 bar.

As a second measure to achieve the above-mentioned precise level of mixing, the inlet bore 1b is positioned as close as possible to the nozzle outlet 1f and is configured with a relatively small size, e.g. with a diameter of less than 1 mm, e.g. between 0.25 mm and 0.75 mm.

In the depicted embodiment, the inlet bore 1b is formed within an injector body 1d of the injector nozzle 1 (e.g. by cutting). The fuel improver 3 is provided at the inlet bore 1b through an injector jacket 1e enclosing the injector nozzle 1 and arranged offset around the injector body 1d. The injector jacket 1e may, for example, be formed by press-fitting a corresponding sleeve on the injector nozzle 1 from below after the inlet bore 1b has been cut out of the injector body 1d. In this vein, the setup may be retrofitted to conventional injector nozzles.

The injector jacket 1e is arranged with an offset with respect to the injector body 1d to improve tightness of the sealing (a larger volume between injector body 1d and injector jacket 1e remains around the inlet bore 1b). A small improver accumulator 1g is arranged within the injector jacket 1e (e.g. ~1 cm$^3$) to receive the improver 3 from the improver inlet 1c and transfer it to the inlet bore 1b.

In the embodiment of FIG. 1, the fuel pump 5 and the improver pump 6 are provided as two separately driven and/or operated high-pressure pumps, e.g. electro-hydraulic pumps, each having its own rail. A fuel rail 7 distributes the fuel 2 from the fuel pump 5 to the fuel inlet 1a via fuel lines 13. An improver rail 8 distributes fuel improver 3 from the improver pump 6 to the improver inlet 1c via improver lines 14.

A joint control unit 11, e.g. the engine control unit (ECU), is configured to synchronize pressure levels within the fuel pump 5 and the improver pump 6 with each other. To this end, the control unit 11 communicates with corresponding pressure sensors 16 in the rails 7, 8 of the system as well as the fuel pumps 5, 6 via control line 17. A pressure relief valve 9 is coupled to the improver rail 8 to stabilize pressure within the improver rail 8 relative to the fuel rail 7 and can thus be used to tune both pressures to each other.

For every injection cycle, the control unit 11 may send a target pressure demand to the fuel pump 5 according to its calibration. The control unit 11 may further send a target pressure to the improver pump 6 according to fuel calibration+micro pressure (e.g. 0.1 bar to 0.7 bar) according to dosing calibration to ensure that the improver pressure is slightly higher than the fuel pressure at least shortly before injection. The pressure relief valve 9 (or another suitable device) meanwhile stabilizes the pressure difference.

In a simple example, the system 10 may require a first pressure for the fuel system of 175 bar. If the system 10 now requests 10 ppm EHN, the pressure at the injector 1 has to be 175 bar+1.4 bar for intrusion, which gives 176.4 bar that has to be applied in the improver system. It should be understood that the exact value for the pressure difference needs to be calibrated for the respective application based on experiments and/or simulations.

In the lower left of FIG. 1, an example of plot is shown depicting the variation of the pressures P of fuel 2 and improver 3 over time. As can be seen, the pressure of the improver 3 is raised above the pressure of the fuel 2 for a short period in time before the actual injection (at the steep edge in the middle of the plot).

Since both pumps 5, 6 operate independently from engine and fuel type, this solution can be used to retrofit existing systems by adding the corresponding components for the delivery of the improver 3 and by making the appropriate changes at the injectors 1.

The corresponding method M shown in FIG. 4 comprises, at step M1, providing the fuel 2 with the fuel pump 5 under the first pressure at the fuel inlet 1a of the injector nozzle 1. The method M also comprises, at step M2, providing the fuel improver 3 with the improver pump 6 under the second pressure at the inlet bore 1b of the injector nozzle 1. The method also comprises, at step M3, injecting the improver enriched fuel 4 into the internal combustion engine at the nozzle outlet 1f.

Figure 5:
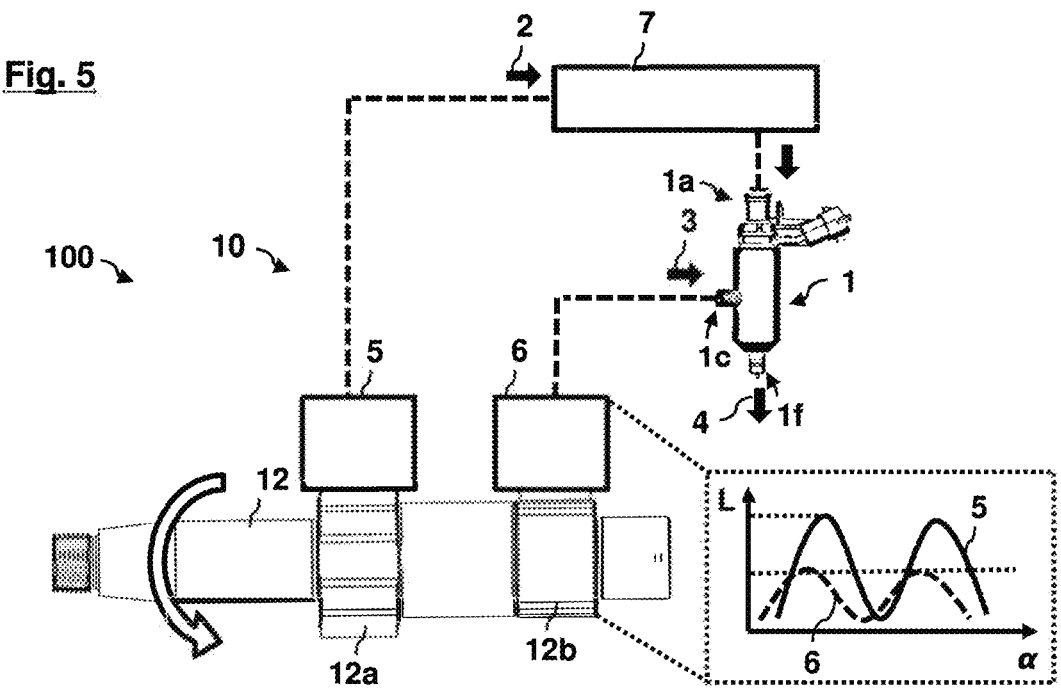
FIG. 5 schematically depicts an injection system for direct injection of an improver enriched fuel according to an alternative embodiment of the present disclosure.

FIG. 5 shows an alternative embodiment of the present disclosure, which uses the same injector design as the one depicted in FIGS. 2 and 3 but relies on a different setup for the pressurization system 15 of fuel 2 and fuel improver 3. In this case, fuel pump 5 and improver pump 6 are mechanically driven and coupled together to a single camshaft 12 of the respective engine. The fuel pump 5 is coupled to a fuel rail 7 in the usual manner. The improver pump 6 on the other hand does not require a dedicated rail in this embodiment due to its lower delivery rate. Pressure sensors are not shown in the figure but may still be required to check that the pressure levels are correct.

The fuel pump 5 may not differ in its parameters and layout from common pressure pumps, e.g. GDI high pressure pumps. The improver pump 6 on the other hand needs to deliver a far lower quantity. Thus, the plunger and the compression chamber can be realized significantly smaller for the improver pump 6. The final dimensions will rather need to match stress instead of quantity targets, e.g. a plunger for 350 bar requires a minimum diameter of ~4 mm. Since this system is very sensitive, a high pressure valve in the improver pump 6 may have a very short opening distance (~0.5 mm) and low spring rate (~2 N preload and stiffness 0.5 N/mm-2 N/mm). This may also secure against intrusion by fuel into the improver circuit.

The plunger lift of each pump needs to be modified in order to allow their pump specific function. The lift for the fuel pump 5 can be parametrized as typically for a fuel pump 5. The lift of the improver pump 6 may be parametrized in relation to the fuel pump 5. Since higher pressure levels are required for the improver 3, the lift has to start before the fuel 2 is pressurized (cf. right hand side plot in FIG. 5). A cam angle for the improver pump 6 may, for example, engage lifting by 5°-25° before the fuel pump 5 lifting, depending on fuel delivery and compressibility of the improver 3. In the ideal case for highest dosing accuracy, the improver cam 12b should lift short before fuel injection, but not during injection, since static pressure in the injector 1 is unknown during injection, but well known before injection. The maximum lift of the improver pump 6 may be configured to reach maximum rail pressure+5 bar (i.e. "micro pressure" maximum). High pressure valve cracking pressure should be considered. A typical range may be 1.2 mm to 2.7 mm. Due to resulting lower lift gradient, target pressure adjustments by a digital inlet valve of the pump units may increase dosing accuracy.

In the foregoing detailed description, various features are grouped together in one or more examples with the purpose of streamlining the present disclosure. It should be understood that the above description is intended to be illustrative, and not restrictive. The above description is intended to cover all alternatives, modifications, and equivalents of the different features and embodiments. Many other examples should be apparent to one having ordinary skill in the art upon reviewing the above specification. The embodiments have been chosen and described in order to explain the principles of the inventive concept and its practical applications. Thus, those having ordinary skill in the art may utilize the present disclosure and the described embodiments with various modifications as are suited to the particular use contemplated.

REFERENCE LIST 1 injector nozzle
1a fuel inlet
1b inlet bore
1c improver inlet
1d injector body
1e injector jacket
1f nozzle outlet
1g improver accumulator
2 fuel
3 fuel improver
4 improver enriched fuel
5 fuel pump
6 improver pump
7 fuel rail
8 improver rail
9 pressure relief valve
10 injection system
11 control unit
12 camshaft
12a fuel cam
12b improver cam
13 fuel line
14 improver line
15 pressurization system
16 pressure sensor
17 control line
18 fuel supply
19 improver supply
100 motor vehicle
P pressure
t time
L plunger lift
α shaft angle
M method
M1-M3 method steps

The invention claimed is:

1. A method for direct injection of an improver enriched fuel into an internal combustion engine of a motor vehicle, the method comprising:
providing a fuel with a fuel pump under a first pressure at a fuel inlet of an injector nozzle;
providing a fuel improver with an improver pump under a second pressure at an inlet bore of the injector nozzle arranged downstream of the fuel inlet with respect to a nozzle outlet of the injector nozzle, wherein the second pressure is higher than the first pressure at least for a limited time interval prior to injection to enrich the fuel with the fuel improver within the injector nozzle; and injecting the improver enriched fuel into the internal combustion engine at the nozzle outlet.

2. The method according to claim 1, wherein the fuel improver is mixed with the fuel within the injector nozzle with a relative abundance of less than 100 ppm.

3. The method according to claim 1, wherein the difference between the first pressure and the second pressure is less than 10 bar.

4. The method according to claim 1, wherein the fuel pump and the improver pump are mechanically driven together by a camshaft of the internal combustion engine.

5. The method according to claim 1, wherein the fuel pump and the improver pump are separately operated high-pressure pumps.

6. The method according to claim 5, wherein the fuel pump provides the fuel at the fuel inlet via a fuel rail and the improver pump provides the fuel improver at the inlet bore via an improver rail, the improver rail being separated from the fuel rail.

7. The method according to claim 6, wherein pressure within the improver rail is stabilized relative to the fuel rail by a pressure relief valve coupled to the improver rail.

8. The method according to claim 1, wherein pressure levels within the fuel pump and the improver pump are synchronized with each other by a joint control unit.

9. The method according to claim 1, wherein the fuel is gasoline or diesel and the fuel improver is an octane or cetane improver based on ethyl hexyl nitrate.

10. An injection system for direct injection of an improver enriched fuel into an internal combustion engine of a motor vehicle, the injection system comprising:

an injector nozzle configured to inject fuel into the internal combustion engine at a nozzle outlet;

a fuel pump configured to provide a fuel under a first pressure at a fuel inlet of the injector nozzle; and an improver pump configured to provide a fuel improver under a second pressure at an inlet bore of the injector nozzle arranged downstream of the fuel inlet with respect to the nozzle outlet of the injector nozzle, wherein the second pressure is higher than the first pressure at least for a limited time interval prior to injection to enrich the fuel with the fuel improver within the injector nozzle.

11. The injection system according to claim 10, wherein the pressure difference between the first pressure and the second pressure and/or a size of the inlet bore is configured such that the fuel improver is mixed with the fuel within the injector nozzle with a relative abundance of less than 100 ppm.

12. The injection system according to claim 10, wherein the difference between the first pressure and the second pressure is less than 10 bar, and/or wherein a diameter of the inlet bore is less than 1 mm.

13. The injection system according to claim 10, wherein the inlet bore is formed within an injector body of the injector nozzle, wherein the fuel improver is provided at the inlet bore through an injector jacket enclosing the injector nozzle and arranged offset around the injector body.

14. The injection system according to claim 10, wherein the fuel pump and the improver pump are mechanically coupled together to a camshaft of the internal combustion engine.

15. The injection system according to claim 10, wherein the fuel pump and the improver pump are both configured as separately operated high-pressure pumps.

16. The injection system according to claim 15, further comprising:

a fuel rail, wherein the fuel pump is configured to provide the fuel at the fuel inlet via the fuel rail; and an improver rail being separated from the fuel rail, wherein the improver pump is configured to provide the fuel improver at the inlet bore via the improver rail.

17. The injection system according to claim 16, further comprising a pressure relief valve coupled to the improver rail and configured to stabilize pressure within the improver rail relative to the fuel rail.

18. The injection system according to claim 10, further comprising a joint control unit configured to synchronize pressure levels within the fuel pump and the improver pump with each other.

19. The injection system according to claim 10, wherein the fuel is gasoline or diesel and the fuel improver is an octane or cetane improver based on ethyl hexyl nitrate.

20. A motor vehicle with an injection system according to claim 10.

* * * * *